United States Patent
Ono

(10) Patent No.: US 10,358,570 B2
(45) Date of Patent: Jul. 23, 2019

(54) THERMOCHROMIC COLOR-MEMORY COMPOSITION AND THERMOCHROMIC COLOR-MEMORY MICROCAPSULE PIGMENT ENCAPSULATING SAME

(71) Applicant: THE PILOT INK CO., LTD., Aichi-ken (JP)

(72) Inventor: Yoshiaki Ono, Aichi-ken (JP)

(73) Assignee: THE PILOT INK CO., LTD., Aichi-Ken (JP)

( * ) Notice: Subject to any disclaimer, the term of this patent is extended or adjusted under 35 U.S.C. 154(b) by 18 days.

(21) Appl. No.: 15/749,853

(22) PCT Filed: Jul. 19, 2016

(86) PCT No.: PCT/JP2016/071148
§ 371 (c)(1),
(2) Date: Feb. 2, 2018

(87) PCT Pub. No.: WO2017/022471
PCT Pub. Date: Feb. 9, 2017

(65) Prior Publication Data
US 2018/0223120 A1 Aug. 9, 2018

(30) Foreign Application Priority Data
Aug. 3, 2015 (JP) ................................. 2015-153455

(51) Int. Cl.
*C09D 11/50* (2014.01)
*C09D 11/037* (2014.01)
(Continued)

(52) U.S. Cl.
CPC .............. *C09D 11/50* (2013.01); *B43K 5/005* (2013.01); *B43K 5/02* (2013.01); *B43K 7/02* (2013.01);
(Continued)

(58) Field of Classification Search
CPC .............. C09K 9/02; C09K 2211/1007; C09K 2211/1018; C09K 9/00; C09D 11/50;
(Continued)

(56) References Cited

U.S. PATENT DOCUMENTS 5,482,912 A 1/1996 Furuya et al.
8,865,621 B2 * 10/2014 Kwan .................... B41M 5/128
106/31.23
(Continued)

FOREIGN PATENT DOCUMENTS

EP 2011-16918 1/2011
JP 63-15781 1/1988
(Continued)

OTHER PUBLICATIONS

International Preliminary Report on Patentability dated Feb. 15, 2018 in International Application No. PCT/JP2016/071148.
(Continued)

*Primary Examiner* — David J Walczak
(74) *Attorney, Agent, or Firm* — Wenderoth, Lind & Ponack, L.L.P.

(57) ABSTRACT

[Problems] An object of the present invention is to provide: a thermochromic color-memory composition which effectively expresses a property of being able to interchangeably memorize and retain colors and which is thus applicable to various fields; and a thermochromic color-memory microcapsule pigment encapsulating the same.
[Solution] Provided is a thermochromic color-memory composition including: (a) an electron-donating color-developing organic compound; (b) an electron-accepting compound; and (c) an ester compound represented by the following Formula (1), as a reaction medium which controls color reaction between the component (a) and the component (b):
(Continued)

[Chem. 1]

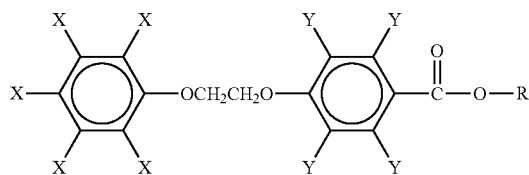

(wherein, R represents an alkyl group having 3 to 18 carbon atoms, a cycloalkylalkyl group having 6 to 11 carbon atoms, a cycloalkyl group having 5 to 7 carbon atoms or an alkenyl group having 3 to 18 carbon atoms; each X independently represents a hydrogen atom, an alkyl group having 1 to 4 carbon atoms, an alkoxy group having 1 to 3 carbon atoms or a halogen atom; and each Y independently represents a hydrogen atom, an alkyl group having 1 to 4 carbon atoms, a methoxy group, an ethoxy group or a halogen atom).

10 Claims, 1 Drawing Sheet

(51) Int. Cl.
| | | |
|---|---|---|
| *C09D 11/17* | (2014.01) | |
| *C09K 9/02* | (2006.01) | |
| *C09B 67/00* | (2006.01) | |
| *B43L 19/00* | (2006.01) | |
| *B43K 5/00* | (2006.01) | |
| *B43K 23/12* | (2006.01) | |
| *B43K 25/02* | (2006.01) | |
| *B43K 29/02* | (2006.01) | |
| *C09D 5/26* | (2006.01) | |
| *B43K 7/02* | (2006.01) | |
| *B43K 8/04* | (2006.01) | |
| *B43K 5/02* | (2006.01) | |

(52) U.S. Cl.
CPC ............... *B43K 8/04* (2013.01); *B43K 23/12* (2013.01); *B43K 25/026* (2013.01); *B43K 29/02* (2013.01); *B43L 19/00* (2013.01); *C09B 67/00* (2013.01); *C09D 5/26* (2013.01); *C09D 11/037* (2013.01); *C09D 11/17* (2013.01); *C09K 9/02* (2013.01); *C09K 2211/1007* (2013.01); *C09K 2211/1018* (2013.01)

(58) Field of Classification Search
CPC ........ C09D 11/037; C09D 11/17; C09D 5/26; C09D 11/00; C09D 11/02; C09D 11/033; C09D 11/08; C09D 11/10; C09B 67/00; C09B 67/0033; B43L 19/00; B43K 5/005; B43K 23/12; B43K 25/026; B43K 29/02; B43K 7/02; B43K 8/04; B43K 5/02

See application file for complete search history.

(56) References Cited

U.S. PATENT DOCUMENTS

| | | |
|---|---|---|
| 2006/0112851 A1 | 6/2006 | Ono et al. |
| 2010/0275813 A1* | 11/2010 | Kurihara ............... C09D 11/17 |
| | | 106/31.13 |
| 2013/0210622 A1 | 8/2013 | Ono |
| 2016/0130455 A1 | 5/2016 | Ono |

FOREIGN PATENT DOCUMENTS

| | | |
|---|---|---|
| JP | 6-329586 | 11/1994 |
| JP | 2005-1369 | 1/2005 |
| JP | 2006-137886 | 6/2006 |
| JP | 2006-188660 | 7/2006 |
| JP | 2008-280523 | 11/2008 |
| JP | 2014-189686 | 10/2014 |
| WO | 2010/064447 | 6/2010 |
| WO | 2010/131684 | 11/2010 |
| WO | 2012/046837 | 4/2012 |
| WO | 2014/200053 | 12/2014 |

OTHER PUBLICATIONS

International Search Report dated Aug. 23, 2016 in International Application No. PCT/JP2016/071148.
Extended European Search Report dated Mar. 14, 2019 in corresponding European patent application No. 16832750.0.

* cited by examiner

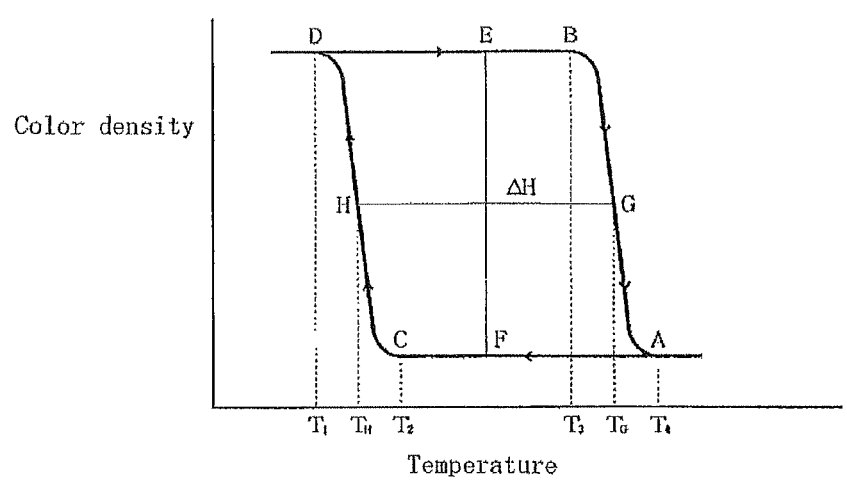

THERMOCHROMIC COLOR-MEMORY COMPOSITION AND THERMOCHROMIC COLOR-MEMORY MICROCAPSULE PIGMENT ENCAPSULATING SAME

BACKGROUND OF THE INVENTION

Field of the Invention

The present invention relates to a thermochromic color-memory composition and a thermochromic color-memory microcapsule pigment encapsulating the same. More particularly, the present invention relates to: a thermochromic color-memory composition which displays reversible discoloration between coloration and decoloration with prominent hysteresis characteristics due to temperature change, and which retains either a colored state or a decolored state in an interchangeable and reversible manner even after terminating the application of heat or cold required for the discoloration; and a thermochromic color-memory microcapsule pigment encapsulating the composition.

Background Art

The present applicant has previously made proposals on thermochromic color-memory materials of this kind (see, for example, Patent Documents 1 to 7).

In conventional reversibly thermochromic materials that change colors across a discoloration temperature, only one specific state, of the states before and after the discoloration, exists in a normal temperature range, and the other state is expressed and maintained only while heat or cold required for the other state to be expressed is being applied, but the state in the normal temperature range is restored once the application of heat or cold is terminated. In contrast to those conventional reversibly thermochromic materials, the above mentioned thermochromic color-memory materials proposed by the present applicant are capable of not only selectively maintaining either a color at the temperature side lower than the discoloration temperature or a color at the temperature side higher than the discoloration temperature, in a normal temperature range, but also being allowed to interchangeably maintain these colors by applying heat or cold thereto as required. Thus, the thermochromic color-memory materials have been applied to a wide variety of fields including the fields of thermochromic recording materials, toys, ornaments and printing.

PRIOR ART DOCUMENTS

Patent Documents

[Patent Document 1] Japanese Patent Laid-open Publication No. 2005-1369
[Patent Document 2] Japanese Patent Laid-open Publication No. 2006-137886
[Patent Document 3] Japanese Patent Laid-open Publication No. 2006-188660
[Patent Document 4] Japanese Patent Laid-open Publication No. 2008-280523
[Patent Document 5] WO 2010/131684
[Patent Document 6] WO 2012/046837
[Patent Document 7] WO 2014/200053

SUMMARY OF THE INVENTION

Problems to be Solved by the Invention

The color-memory effect of this kind is expressed only in a system where specific compounds, among compounds selected from esters, ketones, ethers and the like that control color reaction, are used as constituents. The present invention further searches for a compound functioning as a reaction medium which allows the color-memory effect to be expressed, and an object of the present invention is to improve the freedom in the selection of a reaction medium and thereby further improve the utilization of such a kind of thermochromic color-memory material.

Means for Solving the Problems

The present inventors have discovered that the use of a compound having a specific structure as a reaction medium for color reaction in a system allows prominent thermochromic characteristics with a large hysteresis width ($\Delta H$) to be displayed, thereby achieving an effective color-memory effect. The present invention has been completed based on this discovery.

The present invention relates to a thermochromic color-memory composition comprising: (a) an electron-donating color-developing organic compound; (b) an electron-accepting compound; and (c) an ester compound represented by the following Formula (1), as a reaction medium which controls color reaction between the component (a) and the component (b):

[Chem. 1]

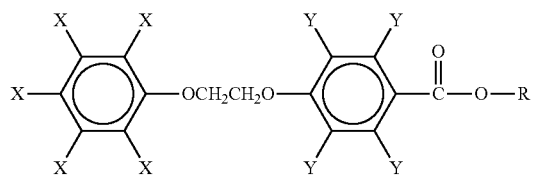

(wherein, R represents an alkyl group having 3 to 18 carbon atoms, a cycloalkylalkyl group having 6 to 11 carbon atoms, a cycloalkyl group having 5 to 7 carbon atoms or an alkenyl group having 3 to 18 carbon atoms; each X independently represents a hydrogen atom, an alkyl group having 1 to 4 carbon atoms, an alkoxy group having 1 to 3 carbon atoms or a halogen atom; and each Y independently represents a hydrogen atom, an alkyl group having 1 to 4 carbon atoms, a methoxy group, an ethoxy group or a halogen atom).

The present invention also relates to a thermochromic color-memory microcapsule pigment encapsulating the thermochromic color-memory composition.

Further, the present invention relates to an ink composition comprising the thermochromic color-memory microcapsule pigment, and a vehicle.

Effects of the Invention

The thermochromic color-memory composition according to the present invention induces reversible discoloration between coloration and decoloration and shows a large hysteresis width ($\Delta H$) upon this reversible discoloration in terms of color density-temperature curve. In addition, the composition is capable of interchangeably memorizing and retaining both colors at the temperature sides higher than and lower than the discoloration temperature, and capable of effectively expressing a property of reproducing, memorizing and retaining either of these colors in a reversible manner by heating or cooling the composition as required. Accordingly, the present invention provides a thermochromic color-memory composition applicable to various fields of temperature indication, ornaments, toys, training and learning elements and the like, as well as a thermochromic color-memory microcapsule pigment encapsulating the composition.

BRIEF DESCRIPTION OF THE DRAWING

FIG. 1 is a graph illustrating the hysteresis characteristics of the thermochromic color-memory composition of the present invention in a color density-temperature curve.

DETAILED DESCRIPTION OF THE INVENTION

The hysteresis characteristics of the thermochromic color-memory composition of the present invention and the thermochromic color-memory microcapsule pigment comprising the same (a reversibly thermochromic composition having a color-memory property and a reversibly thermochromic microcapsule pigment having a color-memory property which comprises the same) will now be described with reference to the graph showing the color density-temperature curve shown in FIG. 1.

In FIG. 1, the color density is plotted on the ordinate and the temperature is plotted on the abscissa. A change in the color density due to temperature change occurs along the arrow. In FIG. 1, "A" is a point which represents the density at a temperature $T_4$ at which a completely decolored state is achieved (hereinafter, referred to as "complete decoloration temperature"); "B" is a point which represents the density at a temperature $T_3$ at which a completely colored state can be maintained (hereinafter, referred to as "decoloration on-set temperature"); "C" is a point which represents the density at a temperature $T_2$ at which a completely decolored state can be maintained (hereinafter, referred to as "coloration on-set temperature"); and "D" is a point which represents the density at a temperature $T_1$ at which a completely colored state is achieved (hereinafter, referred to as "complete coloration temperature").

The discoloration temperature region is a temperature region between $T_1$ and $T_4$, and the temperature region between $T_2$ and $T_3$ is a substantial discoloration temperature region, that is, a temperature region where either a colored state or a decolored state can be maintained.

Specifically, a change of the thermochromic color-memory composition from a decolored state to a colored state can be initiated by cooling the composition to the coloration on-set temperature $(T_2)$ or lower. A completely colored state can be brought about by cooling the composition to the complete coloration temperature $(T_1)$ or lower, and this state can be maintained unless the temperature of the thermochromic color-memory composition is increased to the decoloration on-set temperature $(T_3)$.

Further, a change of the thermochromic color-memory composition from a colored state to a decolored state can be initiated by heating the composition to the decoloration on-set temperature $(T_3)$ or higher with application of heat generated by friction or the like. A completely decolored state can be brought about by heating the composition to the complete decoloration temperature $(T_4)$ or higher, and this state can be maintained unless the temperature of the thermochromic color-memory composition is decreased to the coloration on-set temperature $(T_2)$.

The length of a line segment EF is a scale representing the contrast of discoloration, and the length of a line segment HG is a temperature width representing the degree of hysteresis (hereinafter referred to as "hysteresis width", and indicated as "ΔH"). The greater the ΔH value, the more easily the respective states before and after discoloration can be maintained. The ΔH value in which the respective states before and after discoloration can be maintained is 8° C. or greater, specifically within a range of 8° C. to 80° C. The value of Δt, which is a difference between $T_4$ and $T_3$ or between $T_2$ and $T_1$, is a scale representing the sensitivity of the discoloration, and a practical range thereof is preferably 1° C. to 15° C., and more preferably 1° C. to 10° C.

In order to allow only one specific state, of the states before and after discoloration, to exist in a normal temperature range, the complete decoloration temperature $(T_4)$ is preferably 40° C. or higher, more preferably 50° C. or higher, and still more preferably 60° C. or higher; and the coloration on-set temperature $(T_2)$ is preferably 0° C. or lower, more preferably −5° C. or lower, and still more preferably −10° C. or lower.

Specific compounds to be used as the respective components (a), (b) and (c) will be exemplified below. The component (a) of the present invention, namely, an electron-donating color-developing organic compound, is a color-determining component which develops a color by donating an electron(s) to the component (b), which is a color developer.

Examples of the component (a) in the present invention, namely, the electron-donating color-developing organic compound, include phthalide compounds, fluoran compounds, styrynoquinoline compounds, diazarhodamine lactone compounds, pyridine compounds, quinazoline compounds and bisquinazoline compounds, among which phthalide compounds and fluoran compounds are preferred. Examples of the phthalide compounds include diphenylmethane phthalide compounds, phenylindolyl phthalide compounds, indolyl phthalide compounds, diphenylmethane azaphthalide compounds, phenylindolyl azaphthalide compounds and derivatives of these compounds, among which phenylindolyl azaphthalide compounds and their derivatives are preferred. Examples of the fluoran compounds include aminofluoran compounds, alkoxyfluoran compounds, and derivatives of these compounds.

The above described compounds will be exemplified below.
3,3-bis(p-dimethylaminophenyl)-6-dimethylaminophthalide,
3-(4-diethylaminophenyl)-3-(1-ethyl-2-methylindol-3-yl) phthalide,
3,3-bis(1-n-butyl-2-methylindol-3-yl)phthalide,
3,3-bis(2-ethoxy-4-diethylaminophenyl)-4-azaphthalide,
3-(2-ethoxy-4-diethylaminophenyl)-3-(1-ethyl-2-methylindol-3-yl)-4-azaphthalide,
3-(2-hexyloxy-4-diethylaminophenyl)-3-(1-ethyl-2-methylindol-3-yl)-4-azaphthalide,
3-[2-ethoxy-4-(N-ethylanilino)phenyl]-3-(1-ethyl-2-methylindol-3-yl)-4-azaphthalide,
3-(2-acetamide-4-diethylaminophenyl)-3-(1-propylindol-3-yl)-4-azaphthalide,
3,6-bis(diphenylamino)fluoran,
3,6-dimethoxyfluoran,
3,6-di-n-butoxyfluoran,
2-methyl-6-(N-ethyl-N-p-tolylamino)fluoran,
3-chloro-6-cyclohexylaminofluoran,
2-methyl-6-cyclohexylaminofluoran,
2-(2-chloroamino)-6-dibutylaminofluoran,
2-(2-chloroanilino)-6-di-n-butylaminofluoran,
2-(3-trifluoronnethylanilino)-6-diethylaminofluoran,
2-(3-trifluoronnethylanilino)-6-dipentylaminofluoran, 2-(dibenzylamino)-6-diethylaminofluoran,
2-(N-methylanilino)-6-(N-ethyl-N-p-tolylamino)fluoran,
1,3-dimethyl-6-diethylaminofluoran,
2-chloro-3-methyl-6-diethylaminofluoran,
2-anilino-3-methyl-6-diethylaminofluoran,
2-anilino-3-methoxy-6-diethylaminofluoran,
2-anilino-3-methyl-6-di-n-butylaminofluoran,
2-anilino-3-methoxy-6-di-n-butylaminofluoran,
2-xylidino-3-methyl-6-diethylaminofluoran,
2-anilino-3-methyl-6-(N-ethyl-N-p-tolylamino)fluoran,
1,2-benz-6-diethylaminofluoran,
1,2-benz-6-(N-ethyl-N-isobutylamino)fluoran,
1,2-benz-6-(N-ethyl-N-isoamylamino)fluoran,
2-(3-methoxy-4-dodecoxystyryl)quinoline,
spiro[5H-(1)benzopyrano(2,3-d)pyrimidine-5,1'(3'H)
    isobenzofuran]-3'-one,2-(diethylamino)-8-(diethyl-
    amino)-4-methyl,
spiro[5H-(1)benzopyrano(2,3-d)pyrimidine-5,1'(3'H)
    isobenzofuran]-3'-one,2-(di-n-butylamino)-8-(di-n-buty-
    lamino)-4-methyl,
spiro[5H-(1)benzopyrano(2,3-d)pyrimidine-5,1'(3'H)
    isobenzofuran]-3'-one,2-(di-n-butylamino)-8-(diethyl-
    amino)-4-methyl,
spiro[5H-(1)benzopyrano(2,3-d)pyrimidine-5,1'(3'H)
    isobenzofuran]-3'-one,2-(di-n-butylamino)-8-(N-ethyl-N-
    i-amylamino)-4-methyl,
spiro[5H-(1)benzopyrano(2,3-d)pyrimidine-5,1'(3'H)
    isobenzofuran]-3'-one,2-(dibutylamino)-8-(dipenty-
    lamino)-4-methyl,
4,5,6,7-tetrachloro-3-[4-(dimethylamino)-2-methoxyphe-
    nyl]-3-(1-butyl-2-methyl-1H-indol-3-yl)-1(3H)-isoben-
    zofuranone,
4,5,6,7-tetrachloro-3-[4-(diethylamino)-2-ethoxyphenyl]-3-
    (1-ethyl-2-methyl-1H-indol-3-yl)-1(3H)-isobenzofura-
    none,
4,5,6,7-tetrachloro-3-[4-(diethylamino)-2-ethoxyphenyl]-3-
    (1-pentyl-2-methyl-1H-indol-3-yl)-1(3H)-isobenzofura-
    none,
4,5,6,7-tetrachloro-3-[4-(diethylamino)-2-methylphenyl]-3-
    (1-ethyl-2-methyl-1H-indol-3-yl)-1(3H)-isobenzofura-
    none,
3',6'-bis[phenyl(2-methylphenyl)amino]-spiro[isobenzo-
    furan-1(3H),9'-[9H]xanthen]-3-one,
3',6'-bis[phenyl(3-methylphenyl)amino]-spiro[isobenzo-
    furan-1(3H),9'-[9H]xanthen]-3-one,
3',6'-bis[phenyl(3-ethylphenyl)amino]-spiro[isobenzofuran-
    1(3H),9'-[9H]xanthen]-3-one,
2,6-bis(2'-ethyloxyphenyl)-4-(4'-dimethylaminophenyl)
    pyridine,
2,6-bis(2',4'-diethyloxyphenyl)-4-(4'-dimethylaminophenyl)
    pyridine,
2-(4'-dimethylaminophenyl)-4-methoxy-quinazoline, and
    4,4'-(ethylenedioxy)-bis[2-(4-diethylaminophenyl)qui-
    nazoline].

The fluoran compounds may be compounds which contain a substituent in a xanthene ring-forming phenyl group, and in addition, may also be compounds which have a blue or black color and which contain a substituent in a xanthene ring-forming phenyl group as well as in a lactone ring-forming phenyl group (these substituents may be, for example, an alkyl group such as a methyl group or a halogen atom such as a chloro group).

The component (b) of the present invention, namely an electron-accepting compound, is a compound which receives an electron(s) from the component (a) and functions as a color developer of the component (a).

Examples of the electron-accepting compound include active proton-containing compounds and derivatives thereof; pseudo-acidic compounds (compounds which are not acids but each act as an acid in a composition to cause the component (a) to develop a color); and compounds with electron vacancies. Among these, the component (b) is preferably a compound selected from active proton-containing compounds.

Examples of the active proton-containing compounds and derivatives thereof include phenolic hydroxyl group-containing compounds and metal salts thereof; carboxylic acids and metal salts thereof, preferably aromatic carboxylic acids, aliphatic carboxylic acids having 2 to 5 carbon atoms, and metal salts thereof; acidic phosphoric acid esters and metal salts thereof; as well as azole-based compounds and derivatives thereof, and 1,2,3-triazole and derivatives thereof. Among these, phenolic hydroxyl group-containing compounds are preferred since they can allow effective thermochromic characteristics to be expressed.

The phenolic hydroxyl group-containing compounds include a wide range of compounds, ranging from monophenol compounds to polyphenol compounds, and bis-type and tris-type phenols, phenol-aldehyde condensation resins and the like are also included therein. Among the phenolic hydroxyl group-containing compounds, those which contain at least two benzene rings or have a bis-hydroxyphenyl sulfide structure are preferred. Further, these compounds may also have a substituent, examples of which include an alkyl group, an aryl group, an acyl group, an alkoxycarbonyl group, a carboxy group and an ester thereof, as well as an amide group and a halogen group. Examples of the phenolic hydroxyl group-containing compounds include monophenols and polyphenols; these phenols further including as a substituent an alkyl group, an aryl group, an acyl group, an alkoxycarbonyl group, a carboxy group or an ester or an amide group thereof, a halogen group or the like; and phenol-aldehyde condensation resins such as bis-type phenols and tris-type phenols. Alternatively, the phenolic hydroxyl group-containing compounds may be metal salts of phenolic hydroxyl group-containing compounds.

Examples of the metal contained in the metal salts of the active proton-containing compounds include sodium, potassium, calcium, zinc, zirconium, aluminum, magnesium, nickel, cobalt, tin, copper, iron, vanadium, titanium, lead and molybdenum.

Specific examples of the phenolic hydroxyl group-containing compounds include phenol, o-cresol, tert-butyl catechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 4,4-dihydroxydiphenylsulfone, bis(4-hydroxyphenyl)sulfide, 1,1-bis(4-hydroxyphenyl)ethane, 1,1-bis(4-hydroxyphenyl)propane, 1,1-bis(4-hydroxyphenyl)n-butane, 1,1-bis(4-hydroxyphenyl)n-pentane, 1,1-bis(4-hydroxyphenyl)n-hexane, 1,1-bis(4-hydroxyphenyl)n-heptane, 1,1-bis(4-hydroxyphenyl)n-octane, 1,1-bis(4-hydroxyphenyl)n-nonane, 1,1-bis(4-hydroxyphenyl)n-decane, 1,1-bis(4-hydroxyphenyl)n-dodecane, 1,1-bis(4-hydroxyphenyl)-2-methylpropane, 1,1-bis(4-hydroxyphenyl)-3-methylbutane, 1,1-bis(4-hydroxyphenyl)-3-methylpentane, 1,1-bis(4-hydroxyphenyl)-2,3-dimethylpentane, 1,1-bis(4-hydroxyphenyl)-2-ethylbutane, 1,1-bis(4-hydroxyphenyl)-2-ethylhexane, 1,1-bis(4-hydroxyphenyl)-3,7-dimethyloctane, 1,1-bis(4-hydroxyphenyl)cyclohexane, 1,1-bis(4-hydroxyphenyl)-3,3,5-trimethylcyclohexane, 1-phenyl-1,1-bis(4-hydroxyphenyl)ethane, 2,2-bis(4-hydroxyphenyl)propane, 2,2-bis(4-hydroxyphenyl)n-butane, 2,2-bis(4-hydroxyphenyl)n-pentane, 2,2-bis(4-hydroxyphenyl)n-hexane, 2,2-bis(4-hydroxyphenyl)n-heptan, 2,2-bis(4-hydroxyphenyl)n-octane, 2,2-bis(4-hydroxyphenyl)n-nonane, 2,2-bis(4-hydroxyphenyl)n-decane, 2,2-bis(4-hydroxyphenyl)n-dodecane, 2,2-bis(4-hydroxyphenyl)ethyl propionate, 2,2-bis(4-hydroxyphenyl)-4-methylpentane, 2,2-bis(4-hydroxyphenyl)-4-methylhexane, 2,2-bis(4-hydroxyphenyl)hexafluoropropane, 2,2-bis(4-hydroxy-3-methylphenyl)propane, 9,9-bis(4-hydroxy-3-methylphenyl)fluorene, 1,1-bis[2-(4-hydroxyphenyl)-2-propyl]benzene, bis(2-hydroxyphenyl)methane, 1,1,1-tris(4-hydroxyphenyl)ethane, and 3,3-bis(3-methyl-4-hydroxyphenyl)butane.

By using a specific ester compound as the component (c) of the present invention, namely, as a reaction medium which reversibly induces an electron transfer reaction between the component (a) and the component (b) in a specific temperature range, it is possible to obtain thermochromic color-memory compositions having various discoloration temperatures.

The ester compound to be used in the present invention is a compound represented by the following Formula (1):

[Chem. 2]

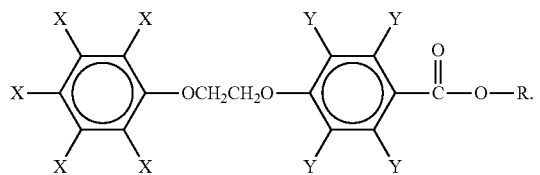

The above described compound can be obtained by etherification of a phenolic hydroxyl group of a p-hydroxybenzoic acid ester (a paraben) with a phenoxyethyl group or the like.

In the Formula (1), R represents an alkyl group having 3 to 18 carbon atoms, a cycloalkylalkyl group having 6 to 11 carbon atoms, a cycloalkyl group having 5 to 7 carbon atoms or an alkenyl group having 3 to 18 carbon atoms, preferably an alkyl group having 6 to 16 carbon atoms, a cycloalkylalkyl group having 6 to 8 carbon atoms or a cyclohexyl group, and more preferably an alkyl group having 6 to 14 carbon atoms or a cyclohexylmethyl group.

In the Formula (1), each X independently represents a hydrogen atom, an alkyl group having 1 to 4 carbon atoms, an alkoxy group having 1 to 3 carbon atoms or a halogen atom, preferably a hydrogen atom, a methyl group, an ethyl group, a methoxy group or an ethoxy group, and more preferably a hydrogen atom, a methyl group or a methoxy group. The respective Xs may be the same as or different from each other.

In the Formula (1), each Y independently represents a hydrogen atom, an alkyl group having 1 to 4 carbon atoms, a methoxy group, an ethoxy group or a halogen atom, preferably a hydrogen atom, a methyl group, an ethyl group or a methoxy group, and more preferably a hydrogen atom, a methyl group or a methoxy group. The respective Ys may be the same as or different from each other.

Specific examples of the ester compound represented by the Formula (1) are shown below.

[Chem. 3]

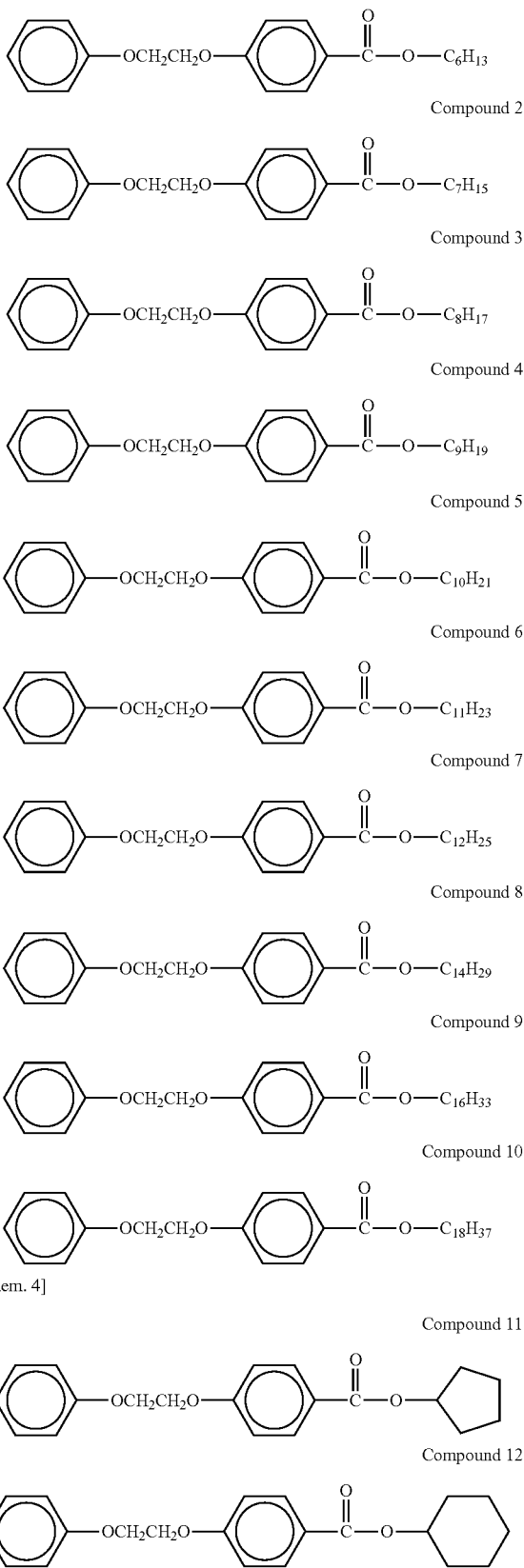

[Chem. 4]

Compound 13
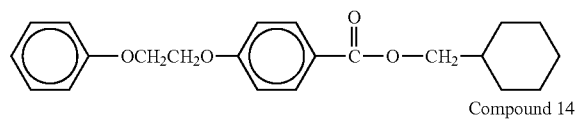
Compound 14
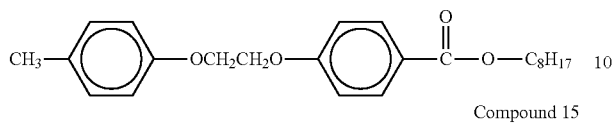
Compound 15
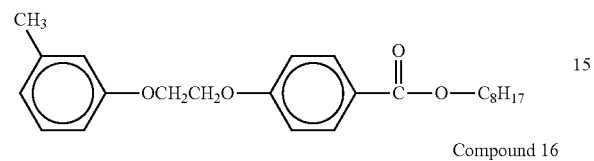
Compound 16
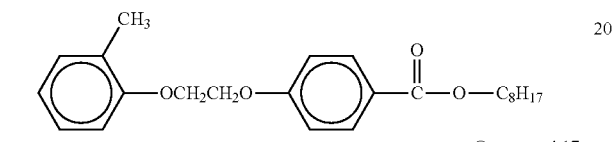
Compound 17
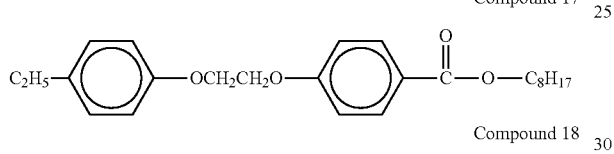
Compound 18
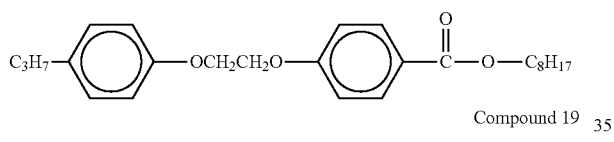
Compound 19
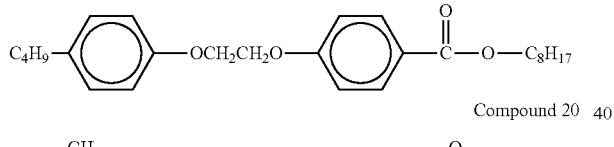
Compound 20
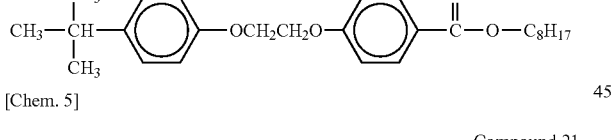
[Chem. 5]
Compound 21
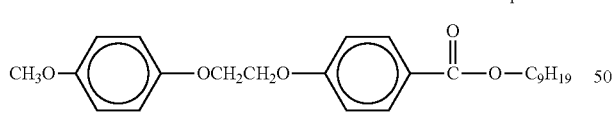
Compound 22
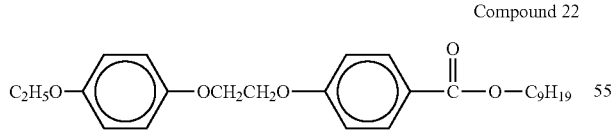
Compound 23
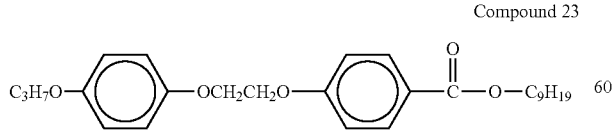
Compound 24
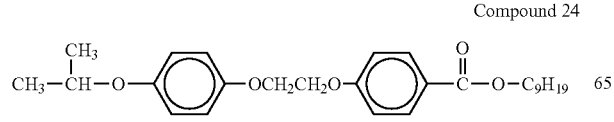
Compound 25
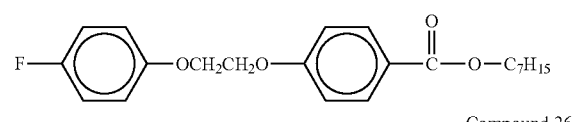
Compound 26
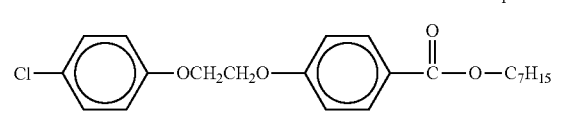
Compound 27
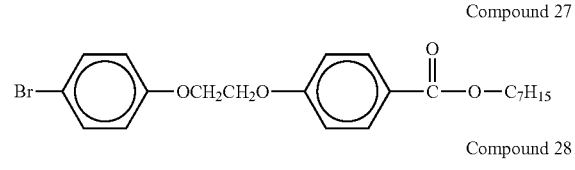
Compound 28
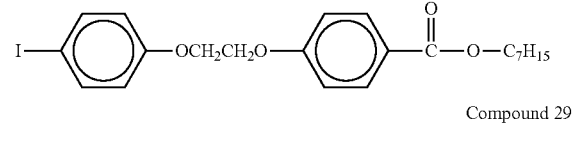
Compound 29
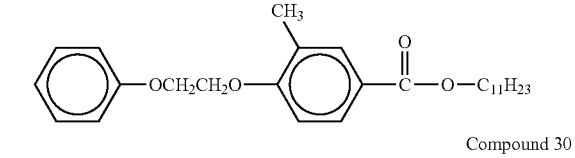
Compound 30
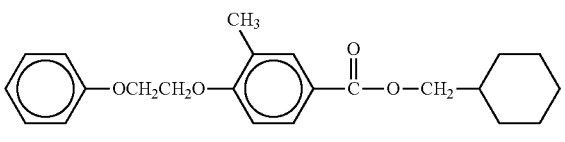
[Chem. 6]
Compound 31
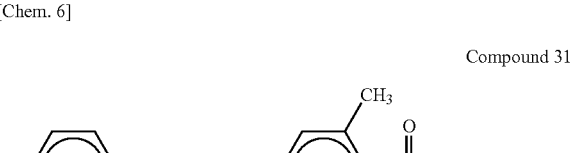
Compound 32
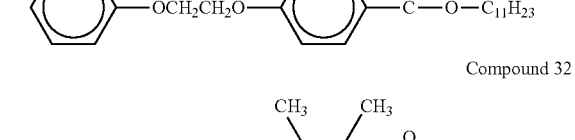
Compound 33
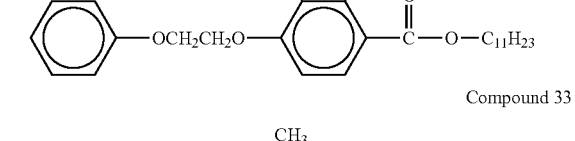
Compound 34
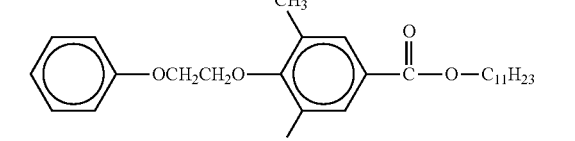

Compound 35
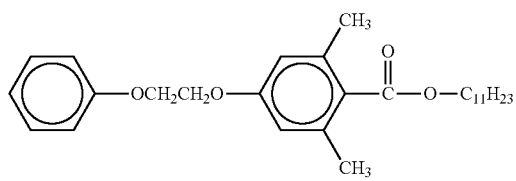
Compound 36
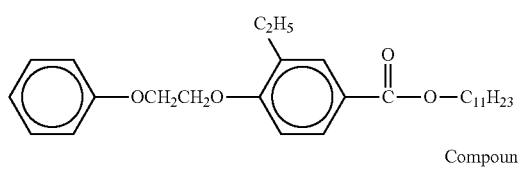
Compound 37
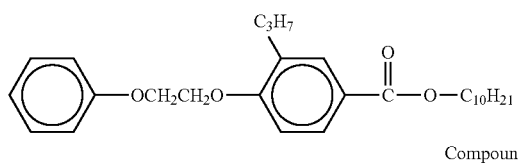
Compound 38
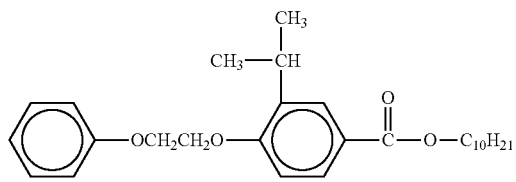
[Chem. 7]
Compound 39
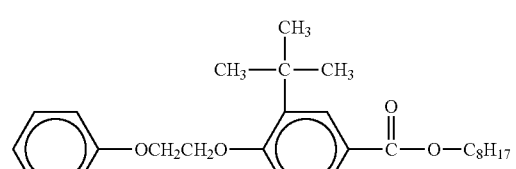
Compound 40
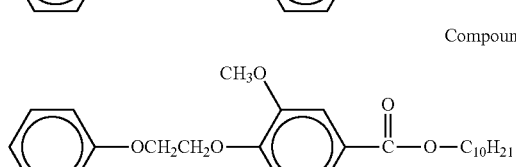
Compound 41
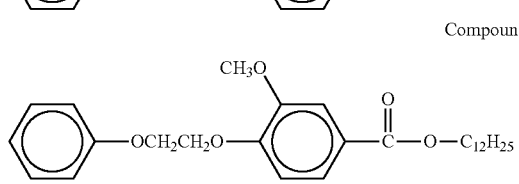
Compound 42
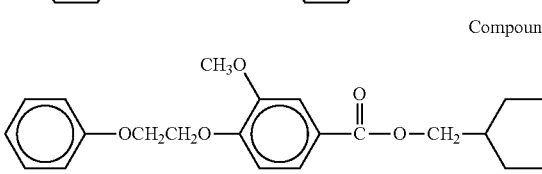
Compound 43
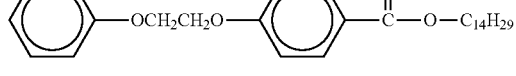
Compound 44
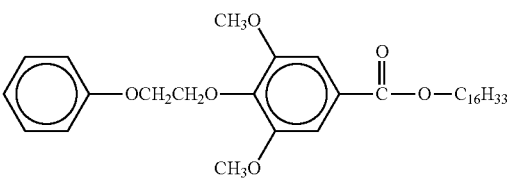
Compound 45
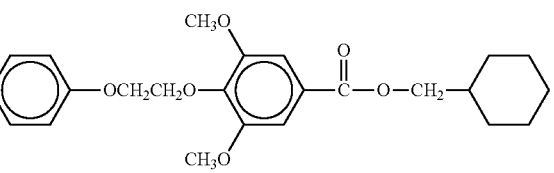
Compound 46
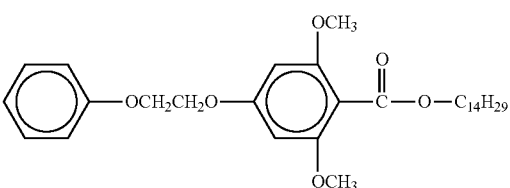
Compound 47
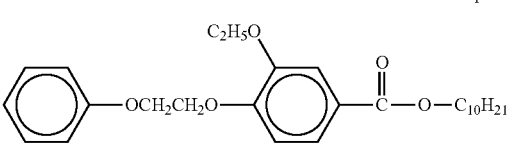
[Chem. 8]
Compound 48
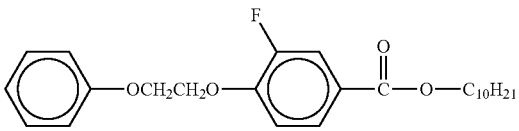
Compound 49
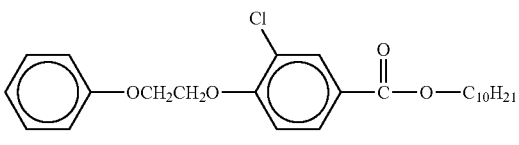
Compound 50
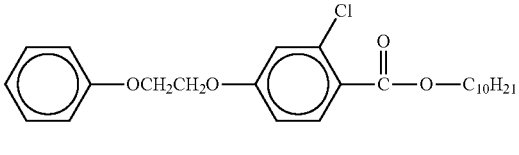
Compound 51
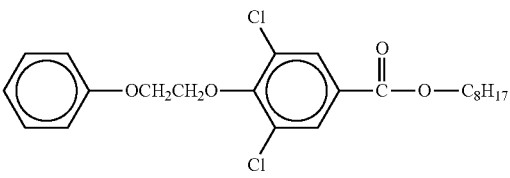

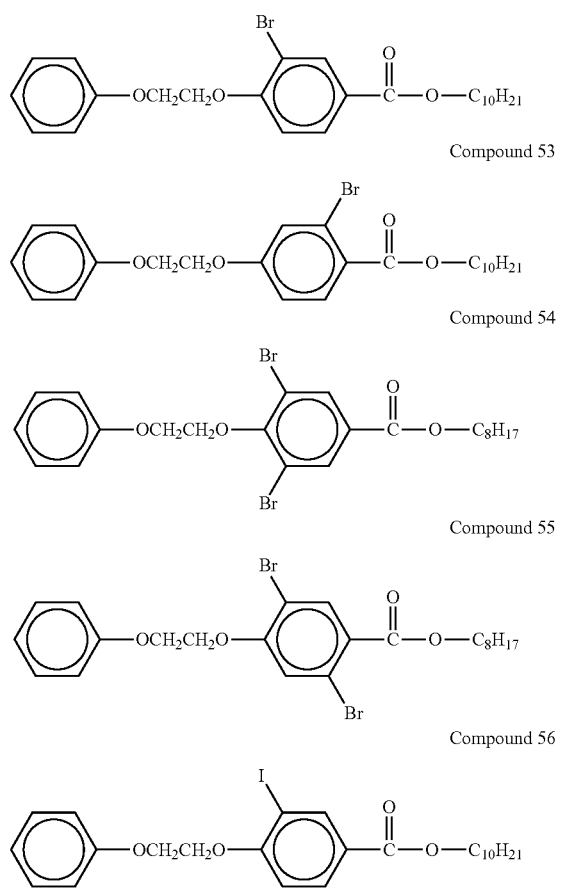

[Chem. 9]

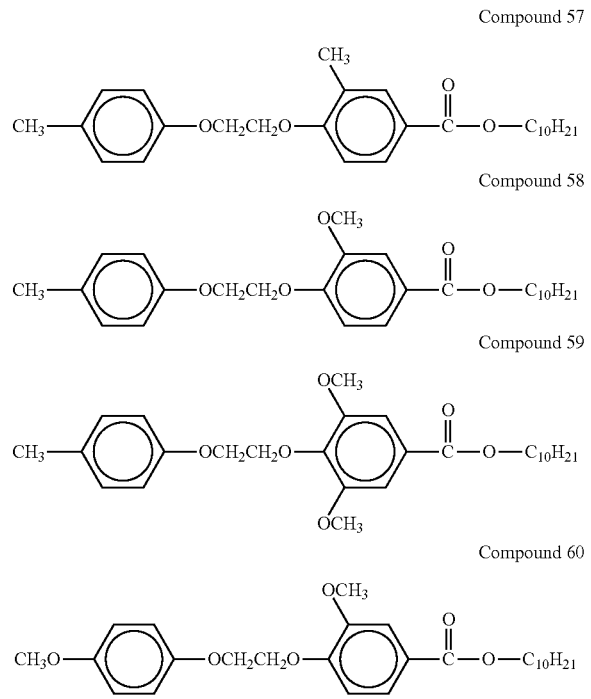

Incorporation of a specific ester compound allows the thermochromic color-memory composition according to the present invention to achieve a broad hysteresis width at a level equal to or higher than that of a composition containing a conventional ester compound, and to have an excellent function of selectively maintaining either a color at the temperature side lower than the discoloration temperature or a color at the temperature side higher than the discoloration temperature. As a result, the thermochromic color-memory composition has excellent applicability to various applications.

When the thermochromic color-memory composition contains a compound other than the compound represented by the Formula (1), the content thereof is preferably 1 to 30 parts by mass, more preferably 2 to 25 parts by mass, and still more preferably 3 to 20 parts by mass, with respect to the total mass of the component (c).

In the present invention, the ratio of the components (a), (b) and (c) varies depending on the concentration, the discoloration temperature, the mode of discoloration and the type of each component. However, in order to obtain desired properties, in general, the ratio of the components is such that the ratio of the component (b) is within a range of preferably 0.1 to 50, more preferably 0.5 to 20, and still more preferably 2 to 20, and the ratio of the component (c) is within a range of preferably 1 to 800, more preferably 5 to 200, and still more preferably 10 to 200, taking the amount of the component (a) as 1 (these ratios are all based on parts by mass).

Each of the components (a), (b) and (c) in the present invention may be a mixture of two or more compounds. The component (c) in the present invention may contain two or more compounds satisfying the Formula (1). Further, the component (c) can be used in combination with any of conventionally known reaction mediums which reversibly induce electron transfer reaction between the component (a) and component (b) in a specific temperature range, such as esters other than those represented by the Formula (1), alcohols, carboxylic acids, ketones and amides.

In the present invention, the three components (a), (b) and (c) can be encapsulated in microcapsules to form a thermochromic color-memory microcapsule pigment. By protecting the components with a capsule membrane wall, it is needless to say that their functions will not be deteriorated even if the components are brought into contact with a chemically active substance such as an acidic substance, a basic substance or a peroxide, or with other solvent components. In addition, the heat stability can also be improved.

Further, the microcapsule pigment can be put into practical use after forming a secondary resin coating film on the surface thereof in accordance with the intended use, so as to impart the microcapsule pigment with durability or to modify the surface properties.

When the microcapsule pigment has a small average particle size, the dispersion stability and the processing suitability tend to improve, when blending the pigment into an ink composition, a paint, or a thermoplastic resin. Further, by forming the microcapsule pigment into fine particles, the ΔH value thereof can be increased relative to the ΔH value of the composition of the three components. When the microcapsule pigment has a large average particle size, on the other hand, there is a tendency that a high-density color development can be achieved. Therefore, the microcapsule pigment preferably has an average particle size of 0.1 to 50 μm, more preferably 0.1 to 30 μm, and particularly preferably 0.5 to 20 μm. When the average particle size of the microcapsule pigment is within this range, the pigment has an improved practicality.

The particle size and the particle size distribution can be measured using a laser diffraction/scattering-type particle size distribution analyzer [manufactured by Horiba, Ltd.; LA-300], and the average particle size (median diameter) is calculated based on volume from the thus measured values.

The composition ratio of the content and the membrane wall (content: membrane wall) constituting the microcapsule pigment is preferably within the range of 7:1 to 1:1 (mass ratio), and it is possible to prevent a reduction in the color density and clarity during color development by adjusting the ratio within the above range. The composition ratio of the content and the membrane wall (content: membrane wall) is more preferably 6:1 to 1:1 (mass ratio).

Examples of the method for carrying out the microencapsulation include conventionally known methods such as interfacial polymerization using an isocyanate system, in situ polymerization using a melamine-formalin system or the like, in-liquid cured coating, phase separation from an aqueous solution, phase separation from an organic solvent, melt dispersion cooling, air suspension coating, and spray drying. The microencapsulation method is selected as appropriate in accordance with the intended use.

In the microcapsule pigment, a conventional dye or pigment (non-thermochromic one) can also be incorporated so as to allow the microcapsule pigment to exhibit a discoloration behavior from a color (1) to a color (2).

By dispersing the thermochromic color-memory microcapsule pigment in a vehicle containing an additive(s) as required to be formed into an ink composition, the resulting ink composition can be used as a thermochromic color-memory liquid composition for: (i) printing inks used in screen printing, offset printing, process printing, gravure printing, coater printing, pad printing or the like; (ii) paints used in brush coating, spray coating, electrostatic coating, electrodeposition coating, flow coating, roller coating, dip coating or the like; (iii) inks for writing instruments such as marking pens, ballpoint pens, fountain pens and brush pens; (iv) inks for coating tools; (v) painting colors; (vi) cosmetics; (vii) coloring liquids for fibers; and the like.

Examples of the additive include resins, cross-linking agents, curing agents, desiccants, plasticizers, viscosity-adjusting agents, dispersants, ultraviolet absorbers, infrared absorbers, antioxidants, light stabilizers, solubilizing aids, anti-settling agents, lubricants, gelling agents, antifoaming agents, delustering agents, penetrating agents, pH regulators, foaming agents, coupling agents, humectants, antifungal agents, preservatives and anticorrosives.

In cases where the ink composition according to the present invention (hereinafter, sometimes simply referred to as "ink") is used as an ink composition for a writing instrument, examples of a vehicle to be included therein include: oil-based vehicles containing an organic solvent; and aqueous vehicles containing water and, as required, an organic solvent.

Examples of the organic solvent which can be used in the present invention include ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone and N-methyl-2-pyrrolidone.

Examples of the ink include shear-thinning inks containing a shear-thinning agent in a vehicle; and cohesive inks which contain a water-soluble polymeric coagulant in a vehicle and in which a pigment is suspended in a loosely aggregated state.

When the ink contains a shear-thinning agent, it is possible to prevent not only the aggregation and sedimentation of the pigment but also bleeding of handwriting, so that good handwriting can be made.

Further, in cases where a ballpoint pen is filled with the ink containing a shear-thinning agent, leakage of the ink from a gap between a ball and a tip can be prevented when the pen is not in use, and backflow of the ink can be prevented when the pen is left with the writing end facing upward (in an upright state).

Examples of the shear-thinning agent include xanthan gum; welan gum; succinoglycans (average molecular weight: about 1,000,000 to 8,000,000), which are organic acid-modified hetero-polysaccharides comprising glucose and galactose as constituting monosaccharides; guar gum; locust bean gum and derivatives thereof; hydroxyethyl cellulose; alkyl alginate esters; polymers containing an alkyl ester of methacrylic acid as a main component and having a molecular weight of 100,000 to 150,000; glucomannan; thickening polysaccharides which have a gelation ability and are extracted from seaweeds, such as agar or carrageenin; benzylidene sorbitol, benzylidene xylitol, and derivatives thereof; cross-linkable acrylic acid polymers; inorganic fine particles; nonionic surfactants having an HLB value of 8 to 12, such as polyglycerin fatty acid esters, polyoxyethylene sorbitan fatty acid esters, polyethylene glycol fatty acid esters, polyoxyethylene alkyl ethers, polyoxypropylene alkyl ethers, polyoxyethylene alkylphenyl ethers and fatty acid amides; salts of dialkyl or dialkenyl sulfosuccinic acids; mixtures of N-alkyl-2-pyrrolidone and an anionic surfactant; and mixtures of a polyvinyl alcohol and an acrylic resin.

Examples of the water-soluble polymeric coagulant which can be used in the present invention include polyvinylpyrrolidones, polyethylene oxides and water-soluble polysaccharides.

Examples of the water-soluble polysaccharides include tragacanth gum, guar gum, pullulan, cyclodextrin and water-soluble cellulose derivatives; and specific examples of the water-soluble cellulose derivatives include methyl cellulose, hydroxyethyl cellulose, hydroxypropyl cellulose, hydroxyethylmethyl cellulose and hydroxypropylmethyl cellulose.

By using a comb-type polymeric dispersant containing carboxyl groups in side chains and an organic nitrogen sulfur compound in combination with the polymeric coagulant, the dispersibility of loose aggregates of the microcapsule pigment formed by the action of the polymeric coagulant can be improved.

The comb-type polymeric dispersant containing carboxyl groups in side chains is not particularly restricted as long as it is a comb-type polymeric compound having a plurality of carboxyl groups in side chains, and it is preferably an acrylic polymer compound having a plurality of carboxyl groups in side chains, examples of which include SOLSPERSE 43000 (trade name) manufactured by Lubrizol Japan Ltd.

The organic nitrogen sulfur compound further prevents the sedimentation of the microcapsule pigment caused by vibration, when the ink is filled in a writing instrument or the like for practical use. This allows for further improving the dispersibility, when dispersing the loose aggregates of the microcapsule pigment by the action of the comb-type polymeric dispersant containing carboxyl groups in side chains.

As the organic nitrogen sulfur compound, a compound selected from thiazole-based compounds, isothiazole-based compounds, benzothiazole-based compounds and benzisothiazole-based compounds is used.

As the organic nitrogen sulfur compound, specifically, one or more compounds selected from 2-(4-thiazoyl)-benzimidazole (TBZ), 2-(thiocyanatemethylthio)-1,3-benzothiazol (TCMTB), 2-methyl-4-isothiazolin-3-one and 5-chloro-2-methyl-4-isothiazolin-3-one are used and, preferably, one or more compounds selected from 2-(4-thiazoyl)-benzimidazole (TBZ), 2-methyl-4-isothiazolin-3-one and 5-chloro-2-methyl-4-isothiazolin-3-one are used.

Examples of the organic nitrogen sulfur compound include TOPSIDE 88, TOPSIDE 133, TOPSIDE 170, TOPSIDE 220, TOPSIDE 288, TOPSIDE 300, TOPSIDE 400, TOPSIDE 500, TOPSIDE 600, TOPSIDE 700Z, TOPSIDE 800 and TOPSIDE 950 (trade names), which are manufactured by Permachem Asia Ltd.; and HOKUSTAR HP, HOKUSTAR E50A, HOKUSIDE P200, HOKUSIDE 6500, HOKUSIDE 7400, HOKUSIDE MC, HOKUSIDE 369 and HOKUSIDE R-150 (trade names), which are manufactured by Hokko Sangyo, Co., Ltd.

The mass ratio of the comb-type polymeric dispersant containing carboxyl groups in side chains and the organic nitrogen sulfur compound is preferably 1:1 to 1:10, and more preferably 1:1 to 1:5. When the mass ratio satisfies the above described range, the dispersibility of the loose aggregates of the microcapsule pigment and an effect of preventing the sedimentation of the microcapsule pigment caused by vibration can be sufficiently exhibited.

Further, addition of a water-soluble resin to the ink allows for imparting the ink with pigment fixability when handwritten on paper surface, and with viscosity. The water-soluble resin also has an effect of further improving the stability of the microcapsule pigment in the ink containing the above described comb-type polymeric dispersant containing carboxyl groups in side chains and the organic nitrogen sulfur compound.

Examples of the water-soluble resin include alkyd resins, acrylic resins, styrene-maleic acid copolymers, cellulose derivatives, polyvinylpyrrolidones, polyvinyl alcohols and dextrin, among which a polyvinyl alcohol is preferably used.

Further, among the polyvinyl alcohols, a partially saponified polyvinyl alcohol having a saponification degree of 70 to 89% by mol is more preferably used, since it exhibits excellent solubility even when the pH of the ink is in an acidic range.

The water-soluble resin is added to the ink in an amount within the range of 0.3 to 3.0% by mass, and preferably 0.5 to 1.5% by mass.

In cases where the ink is filled into a ballpoint pen to be used, it is preferred to prevent abrasion of the ball-receiving base by adding a lubricant, examples of which include higher fatty acids such as oleic acid; nonionic surfactants having a long-chain alkyl group; polyether-modified silicone oils; thiophosphorous acid triesters such as tri(alkoxycarbonylmethylester) thiophosphite and tri(alkoxycarbonylethylester) thiophosphite; phosphomonoesters of polyoxyethylene alkyl ether or polyoxyethylene alkylaryl ether; phosphodiesters of polyoxyethylene alkyl ether or polyoxyethylene alkylaryl ether; and metal salts, ammonium salts, amine salts and alkanolamine salts thereof.

Further, by incorporating 2,5-dimercapto-1,3,4-thiadiazole and/or a salt thereof, it is possible to prevent defective dispersion and aggregation of the microcapsule pigment which occur after the once-frozen ink is thawed again, to prevent an increase in the viscosity of the ink and its accompanying blurring and color-fading of handwriting, as well as to prevent, when the ink is used in a ballpoint pen, corrosion of the ball, even if the pH of the ink is in an acidic or alkaline range.

In addition, the following may be added to the ink, if necessary: (i) a resin which imparts the ink with fixability on paper surface and viscosity, such as an acrylic resin, a styrene-maleic acid copolymer, a cellulose derivative, polyvinylpyrrolidone, polyvinyl alcohol or dextrin; (ii) an inorganic salt such as sodium carbonate, sodium phosphate or sodium acetate; or a pH regulator, for example, an organic basic compound such as a water-soluble amine compound; (iii) an anticorrosive such as benzotriazole, tolyltriazole, dicyclohexylammonium nitrite, diisopropylammonium nitrite or saponin; (iv) a preservative or an antifungal agent, such as phenol, sodium salt of 1,2-benzthiazolin-3-one, sodium benzoate, sodium dehydroacetate, potassium sorbate, paraoxypropylbenzoate or 2,3,5,6-tetrachloro-4-(methylsulfonyl)pyridine; (v) a wetting agent such as urea, a non-ionic surfactant, a reduced or non-reduced starch hydrolysate, an oligosaccharide (e.g. trehalose), sucrose, cyclodextrin, glucose, dextrin, sorbitol, mannitol or sodium pyrophosphate; (vi) an antifoaming agent; (vii) a dispersant; and/or (viii) a fluorine-based or non-ionic surfactant which improves the permeability of the ink.

The ink can contain the thermochromic color-memory microcapsule pigment in an amount of preferably 5 to 40% by mass, more preferably 10 to 40% by mass, and still more preferably 10 to 30% by mass, with respect to the total mass of the ink. By controlling the content of the microcapsule pigment within the above range, it is possible to achieve a desirable color development density and to prevent a decrease in the ink outflow properties.

A writing instrument capable of storing the ink according to the present invention will now be described. In one embodiment, the writing instrument comprises: an axial barrel which stores the ink; and a pen body which delivers the ink stored in the axial barrel. Examples of the pen body include a marking pen body, a ballpoint pen body and a brush pen body. Examples of the marking pen body include marking tips such as fiber tips, felt tips and plastic tips. Examples of the ballpoint pen body include ballpoint pen tips. Examples of the brush pen body include fiber bundles in which fibers are tightly bundled with each other along the longitudinal direction; plastic porous articles having continuous pores; heat-fused or resin-processed articles of synthetic resin fibers; and extrusion-molded articles of a soft resin or an elastomer.

A more detailed description will be given below regarding the case in which the ink according to the present invention is used in a ballpoint pen, or a marking pen.

In cases where the ink according to the present invention is filled into a ballpoint pen, the structure and the shape of the ballpoint pen itself are not particularly restricted. Examples include a ballpoint pen comprising an ink-storing tube in the axial barrel, wherein the ink-storing tube is filled with a shear-thinning ink, communicates with a ballpoint pen tip fitted with a ball on one end, and has a liquid plug for prevention of backflow which is provided in close contact at the end face of the ink in the ink-storing tube.

More specifically, as the ballpoint pen tip, it is possible to use: a tip holding a ball in a ball-holding section formed by press-deforming the vicinity of an end of a metal pipe inwardly from outside; a tip holing a ball in a ball-holding section formed by cutting a metal material using a drill or the like; a tip made of a metal or plastic, in which a ball-receiving base made of a resin is arranged; or a tip in which a ball held therein is pressed forward by a spring, or the like.

As the ball, one which is made of cemented carbide, stainless steel, ruby, ceramic, resin, rubber or the like can be used. The ball preferably has a diameter of 0.3 to 2.0 mm, more preferably 0.3 to 1.5 mm, and still more preferably 0.3 to 1.0 mm.

As the ink-storing tube which stores the ink, for example, a molded article made of a thermoplastic resin such as polyethylene, polypropylene, polyethylene terephthalate or nylon, or a metal tube is used.

The ink-storing tube may be directly connected with the tip, or the ink-storing tube may be connected with the tip via a connection member.

The ink-storing tube may be in the form of a refill to be housed inside an axial barrel made of a resin or metal; or alternatively, an axial barrel fitted with a tip on one end may itself be used as an ink-storing body, and the ink may be directly filled into this axial barrel. The ballpoint pen may be one provided with a cap covering the ballpoint pen tip, or may be a retractable ballpoint pen without a cap.

In cases where the ink is stored in a retractable ballpoint pen, the structure and shape of the retractable ballpoint pen are not particularly restricted, and any retractable ballpoint pen can be used as long as it has a structure in which a ballpoint pen refill is housed inside an axial barrel with the writing end provided thereon being exposed to the outside air, and the writing end is projected from the opening of the axial barrel by the action of a projection-retraction mechanism.

The retractable ballpoint pens can be classified into, for example, knock-type ballpoint pens, rotation-type ballpoint pens, slide-type ballpoint pens, and the like.

Examples of the knock-type ballpoint pens include those having a configuration in which a knocking part is arranged on the rear end or side of the axial barrel and the ballpoint pen tip is projected from the front-end opening of the axial barrel by pushing the knocking part; and those having a configuration in which the ballpoint pen tip is projected from the front-end opening of the axial barrel by pushing a clip arranged on the axial barrel.

Examples of the rotation-type ballpoint pens include those having a configuration in which a rotary part is arranged on a rear part of the axial barrel and the ballpoint pen tip is projected or retracted through the front-end opening of the axial barrel by rotating the rotary part.

Examples of the slide-type ballpoint pens include those having a configuration in which a slide is arranged on the side of the axial barrel and the ballpoint pen tip is projected or retracted through the front-end opening of the axial barrel by operating the slide; and those having a configuration in which the ballpoint pen tip is projected or retracted through the front-end opening of the axial barrel by sliding a clip arranged on the axial barrel.

The retractable ballpoint pen may be of a complex type in which a plurality of ballpoint pen refills are housed inside the axial barrel and the writing end of any one of the ballpoint pen refills is projected or retracted through the front-end opening of the axial barrel by the action of a projection-retraction mechanism.

In general, an ink follower is filled at the end face at the rear end of the ink stored in the ink-storing tube.

An ink follower composition comprises a non-volatile liquid or a hardly volatile liquid. Specific examples thereof include vaseline, spindle oil, castor oil, olive oil, refined mineral oil, liquid paraffin, polybutene, α-olefins, oligomers and co-oligomers of α-olefins, dimethyl silicone oil, methylphenyl silicone oil, amino-modified silicone oil, polyether-modified silicone oil, and fatty acid-modified silicone oil. These may be used singly, or two or more thereof may be used in combination.

It is preferable that the viscosity of the non-volatile liquid and/or hardly volatile liquid be increased to an appropriate level by adding thereto a thickening agent. Examples of the thickening agent include silica having a hydrophobized surface; particulate silica having a methylated surface; aluminum silicate; swellable mica; clay-based thickening agents such as hydrophobized bentonite and montmorillonite; fatty acid metal soaps such as magnesium stearate, calcium stearate, aluminum stearate and zinc stearate; tribenzylidene sorbitol; fatty acid amides; amide-modified polyethylene wax; hydrogenated castor oil; dextrin-based compounds such as fatty acid dextrin; and cellulose-based compounds.

Further, it is also possible to use a liquid ink follower in combination with a solid ink follower.

In cases where the ink composition according to the invention is filled into a marking pen, the structure and shape of the marking pen itself are not particularly restricted. Examples thereof include: a marking pen in which an ink absorbent composed of a fiber bundle is installed in the axial barrel, a marking pen tip composed of a fiber processed body having capillary gaps formed therein is fitted on the axial barrel directly or via a connection member, and a cohesive ink is impregnated into the ink absorbent of the marking pen formed by connecting the ink absorbent and the tip; and a marking pent in which a tip and an ink-storing tube are arranged via a valve which is opened by pushing the tip, and an ink is directly stored in the ink-storing tube.

The tip is a conventionally and widely used porous member which has communicating pores whose porosity is selected to be within a range of about 30 to 70%, and which is made of resin-processed fibers, a fused material of heat-melting fibers, a felt or the like; and one end of the tip is processed into a shape conforming to the intended purpose, such as a cannonball shape, a rectangular shape or a chisel shape, before being put into practical use.

The ink absorbent is obtained by bundling crimped fibers in the longitudinal direction, and configured such that it is provided in a covering material such as a plastic cylinder or a film and the porosity is adjusted to be within a range of about 40% to 90%.

As the valve, a conventionally and widely used pump-type valve can be used; however, a valve whose spring pressure is set such that the valve can be push-opened by writing pressure is preferred.

Further, the form of the ballpoint pen and that of the marking pen are not restricted to those described above, and the writing instrument may be of a double-headed type in which tips of different forms are fitted or pen tips delivering inks of different colors are fitted.

The handwriting produced by writing on a writing surface using a writing instrument containing the ink according to the present invention can be made to change its color with the use of a heating tool or a cooling tool.

As the heating tool, for example, an electro-heating discoloration device equipped with a resistance heating element, a heating discoloration device loaded with hot water or the like, or a hair dryer can be suitably used; however, a friction member is preferably used as a means for simply enabling discoloration. In particular, preferred is an elastic material which does not substantially wear out when rubbed.

The friction member is preferably an elastic material such as an elastomer or foamed plastic, which has excellent elasticity and is capable of generating appropriate friction when rubbed and thereby producing frictional heat.

The handwriting can also be rubbed with a common rubber eraser for erasing the handwriting produced with a pencil; however, since eraser crumbs are generated by the rubbing, the above-described friction member which hardly generates such crumbs is preferably used.

Examples of materials which can be used for the friction member include silicone resins, SEBS resins (styrene-ethylene-butadiene-styrene block copolymers) and polyester-based resins.

Although it is possible to obtain a writing instrument set by combining a writing instrument with a separate member having an arbitrary shape (friction body) as the friction member, excellent portability is attained by arranging the friction member on the writing instrument.

In the case of a writing instrument equipped with a cap, the position at which the friction member is arranged is not particularly restricted. For example, the cap itself can be formed by the friction member; the axial barrel itself can be formed by the friction member; when a clip is arranged, the clip itself can be formed by the friction member; or the friction member can be arranged on the front end (crown) of the cap or the rear end of the axial barrel (the part where a writing end is not arranged).

In the case of a retractable writing instrument as well, the position at which the friction member is arranged is not particularly restricted. For example, the axial barrel itself can be formed by the friction member; when a clip is arranged, the clip itself can be formed by the friction member; or the friction member can be arranged in the vicinity of an opening of the axial barrel, on the rear end of the axial barrel (the part where a writing end is not arranged), or on the knocking part.

As the cooling tool, for example, a cryogenic discoloration device utilizing a Peltier element, a cryogenic discoloration device loaded with a refrigerant such as cold water or crushed ice, a refrigerator or a freezer can be suitably used.

In cases where the thermochromic color-memory liquid composition is coated or printed on a support, the material of the support is not restricted, and any material is effective. Examples thereof include paper, synthetic papers, fibers, fabrics, synthetic leathers, leathers, plastics, glass, ceramics, metals, wood and stone. The shape of the support is not restricted to a planar shape, and the support may be in an irregular shape.

By arranging a reversibly thermochromic layer containing the thermochromic color-memory composition on a support, a laminate (printed article) can be obtained.

In cases where a non-thermochromic colored layer (including an image) has been formed on a support in advance, the colored layer can be made visible or invisible according to temperature change by applying thereon the reversibly thermochromic layer, and this enables to further diversify the mode of change.

Further, the thermochromic color-memory microcapsule pigment can also be melt-blended with a thermoplastic resin, thermosetting resin, wax or the like into the form of pellets, powder or paste and utilized as a resin composition for forming a thermochromic color-memory molded article. By a widely used means such as injection molding, extrusion molding, blow molding or cast molding, a molded article in the form of a three-dimensional article of an arbitrary shape, film, sheet, plate, filament, rod, pipe or the like can be obtained.

Moreover, a crayon can also be obtained by melt-blending the thermochromic color-memory microcapsule pigment into a thermoplastic resin or wax.

It is also possible to incorporate a conventional dye or pigment (non-thermochromic one) into the liquid composition or the resin composition, so as to allow the liquid composition or the resin composition to exhibit a discoloration behavior from a color (1) to a color (2).

By laminating a layer containing a light stabilizer and/or a transparent metallic luster pigment on a molded article obtained by molding the laminate or resin composition, the light resistance of the molded article can be improved; or alternatively, the durability can be improved by arranging a topcoat layer thereon.

Examples of the light stabilizer include ultraviolet absorbers, antioxidants, singlet oxygen quenchers, superoxide anion quenchers and ozone quenchers.

Examples of the transparent metallic luster pigment include pigments prepared by coating the surface of a core substance, such as natural mica, synthetic mica, glass piece, alumina or transparent film piece, with a metal oxide such as titanium oxide.

Specific examples of products including any of the thermochromic color-memory composition, the thermochromic color-memory microcapsule pigment encapsulating the same and the ink are listed below.

(1) Toys:

dolls and animal-figured toys; hair of dolls and animal-figured toys; dollhouses and furniture thereof; doll accessories such as clothes, hats, bags and shoes; accessory toys; stuffed dolls and animals; painting toys; illustrated books for toys; puzzle toys such as jigsaw puzzles; toy bricks; block toys; clay toys; fluid toys; spinning tops; kites; musical toys; cooking toys; gun toys; capturing toys; background toys; toys imitating vehicles, animals, plants, buildings and food articles; and the like.

(2) Clothing:

clothing such as T-shirts, sweat shirts, blouses, dresses, swimsuits, raincoats and skiwear; footwear such as shoes and shoelaces; personal effects made of cloth, such as handkerchiefs, towels and wrapping cloths; gloves; neckties; hats; and the like.

(3) Interior ornaments:

rugs, curtains, curtain cords, tablecloths, carpets, cushions, picture frames, imitation flowers, photo stands and the like.

(4) Furniture:

beddings such as bedclothes, pillows and mattresses; lighting fixtures; air conditioners; and the like.

(5) Accessories:

rings, bracelets, tiaras, earrings, hair stoppers, artificial nails, ribbons, scarfs, watches, glasses and the like.

(6) Stationeries:

writing instruments, stamps, erasers, celluloid boards, rulers, adhesive tapes and the like.

(7) Daily necessaries: cosmetics such as lipsticks, eyeshadows, manicures, hair dyes, artificial nails and paints for artificial nails; toothbrushes; and the like.

(8) Kitchen utensils:

cups, dishes, chopsticks, spoons, forks, pots, frying pans and the like.

(9) Other products:

various printed articles, such as calendars, labels, cards, recording materials and those for forgery prevention; books such as illustrated books; bags; packaging containers; embroidery threads; sporting gears; coasters; musical instruments; pocket warmers; refrigerants; pouches such as wallets; umbrellas; vehicles; buildings; indicators for temperature detection; training and learning articles; and the like.

EXAMPLES

Examples of the present invention will be described below; however, the present invention is not restricted thereto. The methods of producing the thermochromic color-memory composition of the respective Examples and the methods of producing microcapsule pigments encapsulating the respective compositions as well as the method of measuring the hysteresis characteristics of the thermochromic color-memory compositions and microcapsule pigments based on temperature change will now be described.

It is noted here that the unit "part(s)" used in the following Examples represents "part(s) by mass".

Example 1

Method of Preparing Thermochromic Color-memory Composition

Three components composed of 1 part of 2-(2-chloroanilino)-6-di-n-butylaminofluoran as the component (a), 2 parts of 2,2-bis(4-hydroxyphenyl)hexafluoropropane as the component (b), and 50 parts of phenoxyethyl ether of nonyl p-hydroxybenzoate (compound 4) as the component (c) were mixed, and the resultant was heated and uniformly melted to obtain a thermochromic color-memory composition.

The thus obtained thermochromic color-memory composition showed a discoloration from black to colorless.
Preparation of Measurement Sample The thermochromic color-memory composition was filled into a transparent glass capillary tube having an inner diameter of 1 mm and a length of 78 mm up to a height of about 10 mm from the bottom of the capillary tube, thereby preparing a measurement sample.
Measurement of Discoloration Temperature The entire part of the thus obtained measurement sample containing the thermochromic color-memory composition was immersed in a transparent heating medium. While changing the temperature of the transparent heating medium, the discoloration state of the thermochromic color-memory composition was visually observed, and $T_1$ (complete coloration temperature), $T_2$ (coloration on-set temperature), $T_3$ (decoloration on-set temperature) and $T_4$ (complete decoloration temperature) were measured to determine $T_H$ [the intermediate temperature between $T_1$ and $T_2$: $(T_1+T_2)/2$], $T_G$ [the intermediate temperature between $T_3$ and $T_4$: $(T_3+T_4)/2$] and $\Delta H$ (hysteresis width: $T_G-T_H$).

The thermochromic color-memory composition of Example 1 showed the following hysteresis characteristics: $T_1$: 15° C., $T_2$: 19° C., $T_3$: 42° C., $T_4$: 52° C., $T_H$: 17° C., $T_G$: 47° C. and $\Delta H$: 30° C.

Examples 2 to 4

The thermochromic color-memory compositions of Examples 2 to 4 were prepared in the same manner as in Example 1 except that the components (a), (b) and (c) of each thermochromic color-memory composition were changed as shown in the table below, and the discoloration temperatures were also measured in the same manner as in Example 1.

TABLE 1

| Example | Component (a) | Amount | Component (b) | Amount | Component (c) | Amount |
|---|---|---|---|---|---|---|
| 1 | P | 1 part | 2,2-Bis(4-hydroxyphenyl)hexafluoropropane | 2 parts | Phenoxyethyl ether of nonyl p-hydroxybenzoate (compound 4) | 50 parts |
| 2 | Q | 1 part | 2,2-Bis(4-hydroxyphenyl)hexafluoropropane | 2 parts | Phenoxyethyl ether of nonyl p-hydroxybenzoate (compound 4) | 50 parts |
| 3 | R | 1 part | 2,2-Bis(4-hydroxyphenyl)hexafluoropropane | 2 parts | Phenoxyethyl ether of decyl p-hydroxybenzoate (compound 5) | 50 parts |
| 4 | R | 1 part | 2,2-Bis(4-hydroxyphenyl)hexafluoropropane | 2 parts | Phenoxyethyl ether of dodecyl vanillate (compound 41) | 50 parts |

In the column of the component (a) in Table 1, "P" is 2-(2-chloroanilino)-6-di-n-butylaminofluoran; "Q" is 1,2-benz-6-(N-ethyl-N-isoamylamino)fluoran; and "R" is 3-(2-ethoxy-4-diethylaminophenyl)-3-(1-ethyl-2-methylindol-3-yl)-4-azaphthalide. Further, in Table 1, the amounts are given in parts by mass.

The discolorations and the values of $T_1$, $T_2$, $T_3$, $T_4$, $T_H$, $T_G$ and $\Delta H$ of the thermochromic color-memory compositions of Examples 1 to 4 are shown in the table below.

TABLE 2

| | Color change Upon coloration ↔ | Discoloration characteristics (° C.) | | | | | | |
|---|---|---|---|---|---|---|---|---|
| Example | Upon decoloration | $T_1$ | $T_2$ | $T_3$ | $T_4$ | $T_H$ | $T_G$ | $\Delta H$ |
| 1 | Black ↔ Colorless | 15 | 19 | 42 | 52 | 17 | 47 | 30 |
| 2 | Pink ↔ Colorless | 25 | 29 | 43 | 53 | 27 | 48 | 21 |
| 3 | Blue ↔ Colorless | 24 | 26 | 42 | 52 | 25 | 47 | 22 |
| 4 | Blue ↔ Colorless | 19 | 23 | 64 | 74 | 21 | 69 | 48 |

Example 5

Method of Preparing Thermochromic Color-memory Microcapsule Pigment

Thermochromic color-memory composition composed of 1 part of 3-(2-ethoxy-4-diethylaminophenyl)-3-(1-ethyl-2-methylindol-3-yl)-4-azaphthalide as the component (a), 5 parts of 2,2-bis(4-hydroxyphenyl)hexafluoropropane as the component (b), 50 parts of phenoxyethyl ether of nonyl p-hydroxybenzoate (compound 4) and 3 parts of p-methylbenzyl stearate as the component (c) was mixed and uniformly melted by heating. The resultant was further mixed with 20 parts of an aromatic polyvalent isocyanate prepolymer as a membrane wall material and 40 parts of ethyl acetate, and the resulting solution was added to 100 parts of a 15% aqueous gelatin solution and emulsion-dispersed to form microdroplets.

After continuously stirring the thus obtained dispersion at 70° C. for about 1 hour, an aqueous solution obtained by dissolving 2 parts of a water-soluble amine compound (manufactured by Mitsubishi Chemical Corporation, trade name: jER CURE U; an amine adduct of epoxy resin) in 23 parts of water was slowly added thereto with stirring, and the resultant was further continuously stirred for about 3 hours with the temperature thereof being maintained at 90° C., thereby obtaining a thermochromic color-memory microcapsule pigment suspension.

The resulting microcapsule pigment suspension was subjected to centrifugation to isolate a thermochromic color-memory microcapsule pigment which shows a discoloration from blue to colorless (average particle size: 2.2 μm).

Preparation of Measurement Sample

A thermochromic color-memory ink was prepared by uniformly dispersing 40 parts of the thus obtained thermochromic color-memory microcapsule pigment in an aqueous ink vehicle composed of 50 parts of an ethylene-vinyl acetate resin emulsion, 1 part of a leveling agent, 1 part of an antifoaming agent, 0.5 parts of a viscosity-adjusting agent and 7.5 parts of water. A solid pattern was screen-printed using the thus obtained ink on a high-quality paper to prepare a measurement sample.

Measurement of Hysteresis Characteristics

The thus obtained measurement sample was set in the measuring section of a differential colorimeter (TC-3600 differential colorimeter, manufactured by Tokyo Denshoku Co., Ltd.). The sample portion was heated and cooled at a rate of 10° C./min to measure the brightness as the color density at each temperature, and a color density-temperature curve was prepared. From the thus prepared color density-temperature curve, $T_1$, $T_2$, $T_3$, $T_4$, $T_H$ [the intermediate temperature between $T_1$ and $T_2$: $(T_1+T_2)/2$], $T_G$ [the intermediate temperature between $T_3$ and $T_4$: $(T_3+T_4)/2$] and $\Delta H$ (hysteresis width: $T_G-T_H$) were determined.

The thermochromic color-memory microcapsule pigment showed the following hysteresis characteristics: $T_1$: -19° C., $T_2$: -9° C., $T_3$: 40° C., $T_4$: 54° C., $T_H$: -14° C., $T_G$: 47° C. and $\Delta H$: 61° C.

Example 6

The preparation of a thermochromic microcapsule pigment was carried out in the same manner as in Example 5 except that the component (c) of the thermochromic color-memory composition to be encapsulated in microcapsules was changed from 50 parts of phenoxyethyl ether of nonyl p-hydroxybenzoate (compound 4) and 3 parts of p-methylbenzyl stearate to 50 parts of phenoxyethyl ether of undecyl p-hydroxybenzoate (compound 6), to obtain a thermochromic color-memory microcapsule pigment which shows a discoloration from blue to colorless (average particle size: 1.8 μm).

The hysteresis characteristics of the resulting microcapsule pigment were measured in the same manner as in Example 5. As a result, the thermochromic color-memory microcapsule pigment showed the following hysteresis characteristics: $T_1$: -24° C., $T_2$: -6° C., $T_3$: 48° C., $T_4$: 58° C., $T_H$: -15° C., $T_G$: 53° C. and $\Delta H$: 68° C.

Application Example 1

A thermochromic color-memory liquid composition (ink for writing instrument) was prepared by uniformly dispersing 27 parts of the thermochromic color-memory microcapsule pigment prepared in Example 6 (which had been cooled to -24° C. or lower to develop a blue color in advance) in a vehicle composed of 0.3 parts of succinoglycan (shear-thinning agent), 3.0 parts of a sugar mixture [manufactured by Sanwa Starch Co., Ltd., trade name: SANDEC 70], 0.5 parts of a phosphate-based surfactant, 0.1 parts of an antifungal agent, 1.0 part of triethanolamine and 68.1 parts of water.

Preparation of Writing Instrument

An ink-storing tube composed of a polypropylene pipe was filled by suction with the thus obtained ink and connected via a resin-made holder with a ballpoint pen tip holding a 0.5-mm stainless steel ball on its end.

Then, a viscoelastic ink follower (liquid plug) containing polybutene as a main component was filled from the rear end of the polypropylene pipe to obtain a ballpoint pen refill.

The resulting ballpoint pen refill was incorporated into an axial barrel to obtain a writing instrument (retractable ballpoint pen).

The thus obtained writing instrument had a structure in which the ballpoint pen refill was housed inside the axial barrel with a tip provided thereon being exposed to the outside air, and was configured such that the tip was projected from the front-end opening of the axial barrel by the action of a clip-shaped projection-retraction mechanism (sliding mechanism) arranged on the side of the axial barrel.

On the rear end of the axial barrel, a friction member made of an SEBS resin was arranged.

With the end of the ballpoint pen tip being projected from the front-end opening of the axial barrel by the action of the projection-retraction mechanism, the writing instrument was used to write a blue letter (handwriting) on a sheet of paper.

When the handwritten letter was rubbed with the SEBS resin-made friction member arranged on the rear end of the axial barrel, the letter was decolored to colorless, and this state could be maintained under room temperature.

Meanwhile, when the sheet of paper after the decoloration was placed into a freezer and cooled to a temperature of -24° C. or lower, the letter showed a discoloration behavior of turning blue again, and this behavior was repeatedly reproducible.

Application Example 2

A thermochromic color-memory liquid composition (ink for writing instrument) was prepared by uniformly dispersing 27 parts of the thermochromic color-memory microcapsule pigment prepared in Example 5 (which had been cooled to -19° C. or lower to develop a blue color in advance) in an aqueous ink vehicle composed of 0.33 parts of xanthan gum (shear-thinning agent), 10.0 parts of urea, 10 parts of glycerin, 0.6 parts of a nonionic surfactant, 0.1 parts of a modified silicone-based antifoaming agent, 0.2 parts of an antifungal agent and 51.77 parts of water.

Preparation of Writing Instrument

A polypropylene pipe was filled by suction with the thus obtained ink and connected via a resin-made holder with a ballpoint pen tip holding a 0.5-mm stainless steel ball on its end.

Then, a viscoelastic ink follower (liquid plug) containing polybutene as a main component was filled from the rear end of the polypropylene pipe and a tail plug was fitted to the rear of the pipe. After assembling a front axial barrel and a rear axial barrel and further fitting a cap thereto, the resultant was subjected to a degassing treatment by centrifugation to prepare a writing instrument (ballpoint pen).

In the resulting writing instrument, an SEBS rubber as a friction body was attached to the back of the rear axial barrel.

Using the thus obtained writing instrument, a blue letter (handwriting) was written on a sheet of paper.

The handwritten letter showed a blue color at room temperature (25° C.) and, when the letter was rubbed with the friction body, the letter was decolored to colorless and this state could be maintained under room temperature.

Meanwhile, when the sheet of paper after the decoloration was placed into a freezer and cooled to a temperature of −19° C. or lower, the letter showed a discoloration behavior of turning blue again, and this behavior was repeatedly reproducible.

Application Example 3

A thermochromic color-memory liquid composition (ink for writing instrument) was prepared by mixing 25 parts of the thermochromic color-memory microcapsule pigment prepared in Example 6 (which had been cooled to −24° C. or lower to develop a blue color in advance) with 0.5 parts of hydroxyethyl cellulose, 0.2 parts of a comb-type polymeric dispersant [manufactured by Lubrizol Japan Ltd., trade name: SOLSPERSE 43000], 1.0 part of an organic nitrogen sulfur compound [manufactured by Hokko Chemical Industry Co., Ltd., trade name: HOKUSIDE R-150, a mixture of 2-methyl-4-isothiazolin-3-one and 5-chloro-2-methyl-4-isothiazolin-3-one], 0.5 parts of polyvinyl alcohol, 25.0 parts of glycerin, 0.02 parts of an antifoaming agent and 47.78 parts of water.

Preparation of Filled-In Type Writing Instrument

An ink absorbent prepared by covering a polyester sliver with a synthetic resin film was impregnated with the thus obtained ink composition and inserted into an axial barrel made of a polypropylene resin. Then, the axial barrel was assembled with a resin-processed pen body (cannonball shape) made of polyester fibers via a holder in such a manner that the front end of the axial barrel was in contact with the pen body, and a cap was further fitted thereto, to obtain a writing instrument (marking pen).

In the resulting writing instrument, a friction member made of an SEBS resin was attached to the rear end of the axial barrel.

Using the thus obtained writing instrument, a blue letter (handwriting) was written on a sheet of paper.

The handwritten letter showed a blue color at room temperature (25° C.) and, when the letter was rubbed with the friction body, the letter was decolored to colorless and this state could be maintained under room temperature.

Meanwhile, when the sheet of paper after the decoloration was placed into a freezer and cooled to a temperature of −24° C. or lower, the letter showed a discoloration behavior of turning blue again, and this behavior was repeatedly reproducible.

Application Example 4

A thermochromic color-memory liquid composition (paint) was prepared by uniformly dispersing 2.5 parts of the thermochromic color-memory microcapsule pigment prepared in Example 6 and 1.5 parts of a non-thermochromic fluorescent pink pigment in an oil-based ink vehicle composed of 12.5 parts of a vinyl chloride-vinyl acetate copolymer resin, 38.3 parts of xylene, 45 parts of butyl acetate and 0.2 parts of a viscosity-adjusting agent.

After allowing the thus obtained paint to change its color to purple by cooling it to a temperature of −24° C. or lower, the paint was spray-coated on a plug part (white) of a household electric cord to form a reversibly thermochromic layer, thereby obtaining a thermochromic color-memory plug.

The resulting plug showed a purple color at room temperature (25° C.); however, when heated, it turned pink at a temperature of 58° C. or higher. When the plug was cooled from this discolored state, it turned purple again at a temperature of −24° C. or lower.

Once this thermochromic color-memory plug turns pink at a temperature of 58° C. or higher, it is capable of maintaining the discolored state in pink unless it is cooled to a temperature of −24° C. or lower. This enabled to visually detect the temperature history in cases where the plug was abnormally overheated and reached a high-temperature range of 58° C. or higher.

Application Example 5

A thermochromic color-memory liquid composition (printing ink) was prepared by uniformly dispersing 30 parts of the thermochromic color-memory microcapsule pigment prepared in Example 5 (which had been cooled to −19° C. or lower to develop a blue color in advance) in an aqueous ink vehicle composed of 60 parts of an acrylic resin emulsion (solid content: 45%), 1 part of a viscosity-adjusting agent, 0.2 parts of an antifoaming agent and 8.8 parts of water.

Using the thus obtained ink, a pattern composed of a large number of star shapes was screen-printed on a white T-shirt (made of cotton) with a 100-mesh screen plate to obtain a thermochromic color-memory T-shirt.

At room temperature (25° C.), a large number of blue star shapes were visually recognized on the surface of the T-shirt, and the color of the star shapes was not changed by the body temperature or ambient temperature. However, when the T-shirt was heated to 54° C. or higher, the star shapes turned colorless, and the blue star shapes were visually recognized again when the T-shirt was cooled to −19° C. or lower.

It was possible to arbitrarily change the design of the T-shirt by decoloring some of the star shapes by heating the T-shirt with an iron or the like, to form a pattern in which arbitrarily selected star shapes alone were decolored, or to form a letter(s) or a pattern with the star shapes. Further, the T-shirt was able to retain such a discolored state in a room temperature range, and by heating the whole T-shirt to 54° C. or higher to decolor all of the star shapes and then cooling the T-shirt to −19° C. or lower, it was possible to allow the decolored star shapes to develop the color again.

Application Example 6

Using an extruder, 5 parts of the thermochromic color-memory microcapsule pigment prepared in Example 6, 1 part of a dispersant, 0.1 parts of a non-thermochromic pink pigment and 93.9 parts of a polypropylene homopolymer were melted and mixed at 180° C., to obtain a resin composition (pellets) for forming a thermochromic color-memory molded article.

Using the thus obtained pellets, a plastic cup was molded by an injection molding machine at a cylinder temperature of 180° C.

This cup turned purple when cooled to −24° C. or lower, and still retained the purple color even when left to stand at room temperature (25° C.). However, when a beverage having a temperature of 58° C. or higher was poured into the cup, the portion of the cup containing the beverage turned pink. When the beverage was removed and the cup was cooled to −24° C. or lower, the portion of the cup which had turned pink turned back to purple again.

Application Example 7

A thermochromic color-memory liquid composition (printing ink) was prepared by uniformly dispersing 20 parts of the thermochromic color-memory microcapsule pigment prepared in Example 5 (which had been cooled to −19° C. or lower to develop a blue color in advance) in an aqueous ink vehicle composed of 78.0 parts of an acrylic resin emulsion (solid content: 40%) and 2.0 parts of an antifoaming agent.

On a gift certificate printed with a non-thermochromic ink on a high-quality paper, a forgery detection mark was gravure-printed, using the thus obtained thermochromic color-memory ink. The resulting forgery detection mark showed a blue color at room temperature (25° C.) and its color was not changed by the body temperature or ambient temperature. However, the mark turned colorless when heated to 54° C. or higher, and the mark turned back to blue again when cooled to −19° C. or lower.

Since this forgery detection mark printed on the gift certificate shows a blue color and does not change its color within a room temperature range, it cannot be identified as a forgery detection mark; however, the mark turns colorless when heated to 54° C. or higher and thus has a forgery-preventing function.

Description of Symbols $T_1$: complete coloration temperature
$T_2$: coloration on-set temperature
$T_3$: decoloration on-set temperature
$T_4$: complete decoloration temperature ΔH: hysteresis width

The invention claimed is:

1. A thermochromic color-memory composition comprising:
   (a) an electron-donating color-developing organic compound;
   (b) an electron-accepting compound; and
   (c) an ester compound represented by the following Formula (1), as a reaction medium which controls color reaction between the component (a) and the component (b):

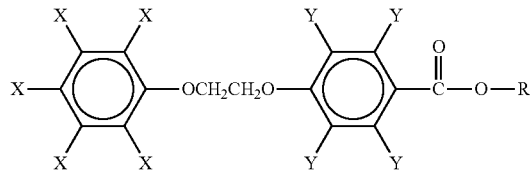

[Chem. 1]

(wherein, R represents an alkyl group having 3 to 18 carbon atoms, a cycloalkylalkyl group having 6 to 11 carbon atoms, a cycloalkyl group having 5 to 7 carbon atoms or an alkenyl group having 3 to 18 carbon atoms; each X independently represents a hydrogen atom, an alkyl group having 1 to 4 carbon atoms, an alkoxy group having 1 to 3 carbon atoms or a halogen atom; and each Y independently represents a hydrogen atom, an alkyl group having 1 to 4 carbon atoms, a methoxy group, an ethoxy group or a halogen atom).

2. The thermochromic color-memory composition according to claim 1, wherein, in the ester compound represented by the Formula (1), R represents an alkyl group having 6 to 16 carbon atoms, a cycloalkylalkyl group having 6 to 8 carbon atoms or a cyclohexyl group, or an alkyl group having 6 to 14 carbon atoms or a cyclohexylmethyl group; each X independently represents a hydrogen atom, a methyl group, an ethyl group, a methoxy group or an ethoxy group; and each Y independently represents a hydrogen atom, a methyl group, an ethyl group or a methoxy group.

3. The thermochromic color-memory composition according to claim 1, wherein the component (a) is a compound selected from the group consisting of phthalide compounds, fluoran compounds, styrynoquinoline compounds, diazarhodamine lactone compounds, pyridine compounds, quinazoline compounds and bisquinazoline compounds.

4. The thermochromic color-memory composition according to claim 1, wherein composition ratios of the component (b) and the component (c) with respect to 1 part of the component (a) are 0.1 to 50 parts and 1 to 800 parts, respectively, on mass basis.

5. The thermochromic color-memory composition according to claim 1, having a hysteresis width ΔH of 8° C. to 80° C.

6. A thermochromic color-memory microcapsule pigment encapsulating the thermochromic color-memory composition according to claim 1.

7. An ink composition comprising the thermochromic color-memory microcapsule pigment according to claim 6, and a vehicle.

8. The ink composition according to claim 7, comprising the thermochromic color-memory microcapsule pigment in an amount of 5 to 40% by mass with respect to the total mass of the ink composition.

9. A writing instrument comprising: an axial barrel which stores the ink composition according to claim 7; and a pen body which delivers the ink composition stored in the axial barrel.

10. The writing instrument according to claim 9, further comprising a friction member.

* * * * *